(12) United States Patent
Martucci et al.

(10) Patent No.: US 7,449,080 B2
(45) Date of Patent: *Nov. 11, 2008

(54) CORRUGATED HOSE ASSEMBLY

(76) Inventors: Norman S. Martucci, 9830 Rilton, Clarkston, MI (US) 48348; Boney A. Mathew, 7169 Blue Water Dr., Clarkston, MI (US) 48348; Rich Hahn, 42600 Mound Rd., Sterling Heights, MI (US) 48314

( * ) Notice: Subject to any disclaimer, the term of this patent is extended or adjusted under 35 U.S.C. 154(b) by 170 days.

This patent is subject to a terminal disclaimer.

(21) Appl. No.: 10/663,317

(22) Filed: Sep. 15, 2003

(65) Prior Publication Data

US 2004/0126527 A1 Jul. 1, 2004

Related U.S. Application Data

(63) Continuation-in-part of application No. 09/634,277, filed on Aug. 9, 2000, now Pat. No. 6,641,884.

(51) Int. Cl.
*B29C 53/00* (2006.01)

(52) U.S. Cl. ............... 156/218; 156/196; 156/205; 156/206; 156/209; 156/244.13; 156/244.24

(58) Field of Classification Search ......... 156/297–300, 156/244.13, 196, 205, 206, 209, 218, 244.24
See application file for complete search history.

(56) References Cited

U.S. PATENT DOCUMENTS

| | | | |
|---|---|---|---|
| 2,991,808 A | | 7/1961 | Siegmann et al. |
| 3,864,446 A | | 2/1975 | Maroschak |
| 3,976,414 A | * | 8/1976 | Hegler et al. ............. 425/131.1 |
| 4,104,095 A | | 8/1978 | Shaw |
| 4,800,109 A | | 1/1989 | Washizu |
| 5,305,799 A | | 4/1994 | Dal Palu |
| 5,324,557 A | * | 6/1994 | Lupke .................... 428/36.5 |
| 5,460,771 A | * | 10/1995 | Mitchell et al. ............. 264/508 |
| 5,518,676 A | * | 5/1996 | de Rocheprise ............. 264/127 |
| RE35,527 E | | 6/1997 | Martucci |
| 5,653,266 A | * | 8/1997 | Reynolds et al. ............ 138/137 |
| 6,016,848 A | * | 1/2000 | Egres, Jr. ................... 138/137 |

* cited by examiner

*Primary Examiner*—Michael C Miggins
(74) *Attorney, Agent, or Firm*—Baker & Hostetler LLP

(57) ABSTRACT

According to the present invention, there is provided a hose assembly with an inner fluoropolymer layer having a somewhat smooth inner surface and an outer polyamide layer having an undulated surface.

14 Claims, 2 Drawing Sheets

CORRUGATED HOSE ASSEMBLY

CROSS-REFERENCE TO RELATED APPLICATIONS

This application is a Continuation-In-Part of U.S. patent application Ser. No. 09/634,277, filed Aug. 9, 2000, now U.S. Pat. No. 6,641,884 which is incorporated herein by reference.

BACKGROUND OF THE INVENTION

1. Field of the Invention

The subject invention relates to a hose construction. More specifically, the subject invention relates to a hose assembly having an inner fluoropolymer layer with a jacket used in automotive, aeronautics and other environs for carrying fluids, such as fuels.

2. Description of Related Art

Hose assemblies for conveying fuels are well known in the art. Such assemblies are exposed to a variety of fuel mixtures and fuel additives in addition to extreme engine temperatures. Such hose assemblies must be resistive to chemicals, as well as heat resistant to degradation as a result of chemical and heat exposure.

Fluoropolymer materials, such as polytetrafluoroethylene possess the requisite chemical and temperature resistant properties for most fuel hose applications. However, fluoropolymer materials exhibit relatively poor tensile and hoop strengths. As a consequence, such fluorinated materials are prone to kinking. Such kinking remains permanent and provides a continual resistance to fluid flow through the hose assembly. Moreover, as a result of the fluorinated material low tensile strength, attachment of securing or coupling members to the hose assembly is unreliable.

Various approaches have been described for offering additional strength to a fluoropolymer layer. One approach involves braiding fibers about the inner fluorocarbon layer. The braided fibers offer additional strength for the fluorocarbon layer resulting in a hose assembly that resists kinking. An example of such an approach is disclosed in co-pending U.S. Ser. No. 08/535,734, filed Jun. 11, 1990, and assigned to the assignee of the subject invention. A drawback of such braiding techniques, however, is the extensive labor and time involved.

Additional examples for strengthening an inner fluorocarbon layer with an jacket are shown in U.S. Pat. No. 2,991,808 to Sigmann, U.S. Pat. No. 4,104,095 to Shaw, and U.S. Pat. No. 4,800,109 to Washizo, all of which disclose the use of a polytetrafluoroethylene first layer supported with an jacket.

Alternatively, some patents in the prior art utilize both a jacket and a braided layer for added strength as shown in U.S. Reissue No. 35,527. However, there remain problems with the bending capabilities of such tubing in conjunction with the jacket.

Furthermore, some patents in the prior art utilize multi-layer hoses with corrugated outer surfaces for added strength at the bending sites, as shown in the U.S. Pat. No. 5,305,799, to Holmgren. However, these processes have not been utilized for hoses having an inner fluoropolymer layer and an outer polyamide layer.

Additionally, some patents in the prior art utilize machines for creating corrugation, as shown in the U.S. Pat. No. 3,864,446, to Maroschak. However, there remain problems in creating corrugation without having to corrugate the entire hose assembly.

It would therefore be useful to develop a hose, which is resistant to kinking when being bent without adding extensive labor or time to the manufacturing process.

SUMMARY OF THE INVENTION

According to the present invention, there is provided a hose assembly with an inner fluoropolymer layer having a smooth inner surface and a jacket having an undulated surface. A method is provided for making a hose assembly by forming a smooth inner fluoropolymer layer without undulations and a jacket having undulations.

DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
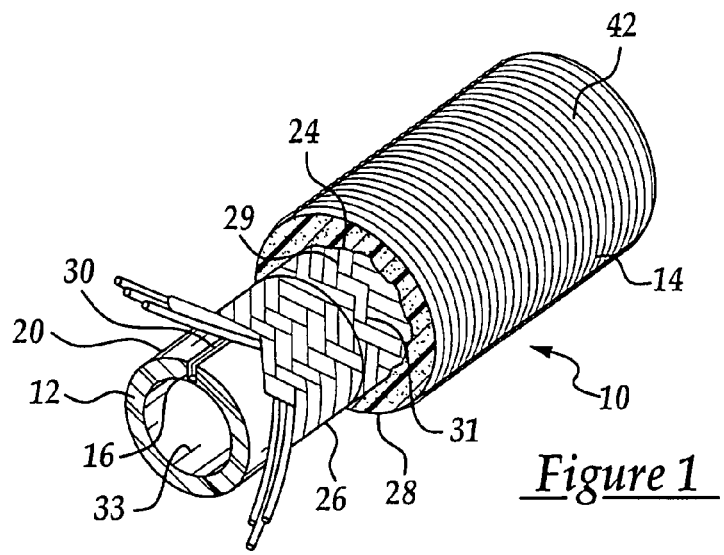
FIG. 1 is a prospective view partially broken away and in cross section of the preferred embodiment of the subject invention.
Figure 2:
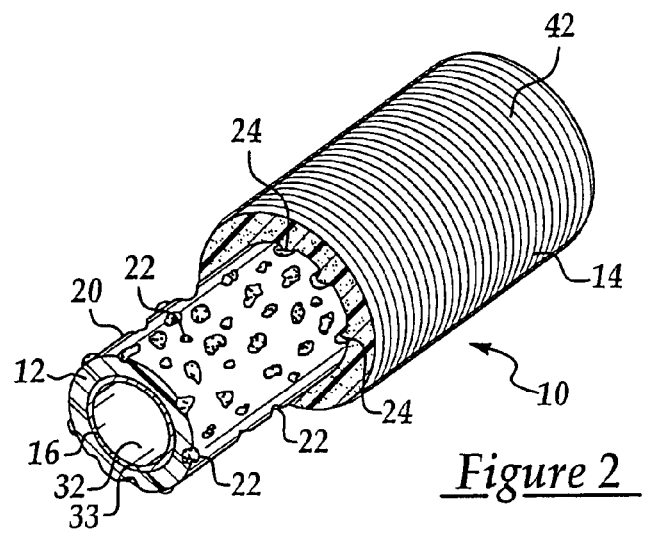
FIG. 2 is a prospective view partially broken away and in cross section of an alternate embodiment of the subject invention.
Figure 3:
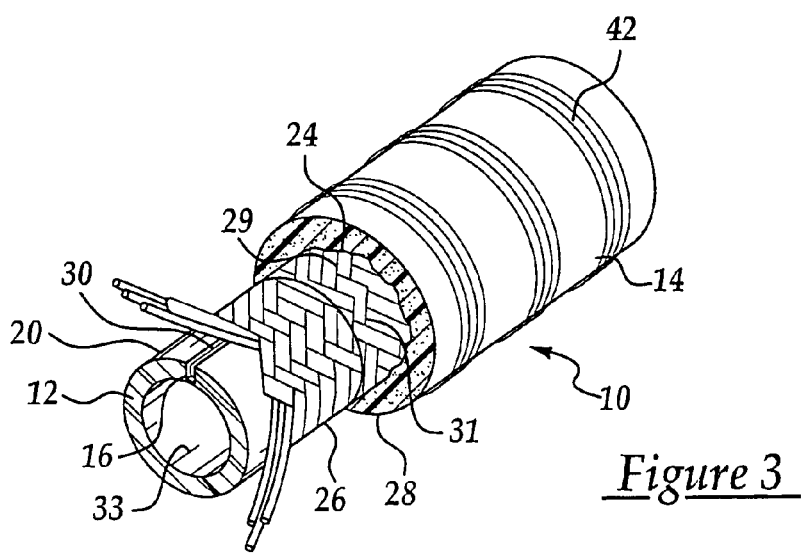
FIG. 3 is a prospective view partially broken away and in cross section of an alternate embodiment of the subject invention.

A hose assembly made in accordance with the present invention is generally shown at 10 and FIGS. 1, 2, and 3. The assembly 10 includes a tubular first layer 12, an jacket 14 disposed about the first layer 12 a coupling mechanism 18 (FIG. 4) adapted to engage the end of the hose assembly 10 and undulations or corrugations 42 on the outer surface of the jacket 14.

Alternatively, the hose assembly 10 of the present invention includes a tubular first layer 12 having undulations or corrugations about the outer surface 13 of the layer 12, while maintaining a generally smooth inner surface 15. The first layer 12 with the undulations provides the same benefits as the assembly 10, which includes a jacket 14. In other words, the hose assembly 10 has the same stability and hose strength as a hose assembly 10, which includes a jacket 14 disposed about the first layer 12.

The tubular first layer 12, as best shown in FIGS. 1, 2, and 3, is made from a fluoropolymer material resistant to both chemical and heat degradation, allowing a variety of fluids, particularly automotive fuels and fuel additives, e.g., detergents, alcohols, etc., to pass through the first layer 12 without corroding or degrading the first layer 12. The first layer 12 is preferably extruded using well-known melt or paste extrusion techniques and has a wall thickness of between 0.001 and 0.120 inches.

Although the first layer 12 can be made of any number of fluoropolymer materials, the first layer 12 is ideally made from a polymer of the following: polytetrafluoroethylene (PTFE), the homopolymer of tetrafluoroethylene sold under the trademark TEFLON by DuPont; perfluorinated ethylene-propylene (FEP), the copolymer of tetrafluoroethylene and hexafluoropropylene sold under the trademark TEFLON FEP by DuPont; perfluoroalkoxy fluorocarbon resin (PFA), the copolymer of tetrafluoroethylene-perfluorovinyl ethyl, sold under the trademark TEFLON PFA by DuPont; or ethylene tetrafluoroethylene (ETFE), the copolymer of ethylene and tetrafluoroethylene sold under the trademark TEF-ZEL by DuPont PVDF and THV, VFEP (DYNEON). In addition to the aforementioned fluoropolymer materials, polychlorotrifluoroethylene, the homopolymer of chlorotrifluoroethylene, and polychlorotrifluoroethylene-ethylene, the copolymer of chlorotrifluoroethylene and ethylene can also be used.

The jacket 14, best shown in FIGS. 1, 2, and 3, is disposed about the first layer 12. The jacket 14 can be made up of a polyamide material for increasing strength of the hose assembly 10. Alternatively, the jacket 14 can be made of other materials known to those of skill in the art which add strength to the hose assembly, such as an elastomer. More specifically, the jacket 14 allows the first layer 12 to bend without kinking. That is, the jacket 14 provides strength to the first layer 12 upon bending. This is commonly referred to as hoop strength. Thus, by disposing the jacket 14 having undulations 42 about the first layer 12, the hoop strength of the first layer 12 is increased. Further, the jacket 14 adds to the working pressure of the hose. That is, the jacket 14 provides strength to the first layer 12 and allows the first layer 12 to accommodate a fluid under pressure. Additionally, the jacket 14 adds to the tensile strength of the hose assembly 10. When coupling members 18 (FIG. 6) are disposed at the ends of the hose assembly 10, as described below, the jacket 14 increases the tensile strength of the hose assembly 10 sufficient to fixedly connect the coupling member 18 (FIG. 4) to the hose assembly 10. By disposing the jacket 14 having undulations 42 about the first layer 12, the bend radius of the hose is improved.

Although the jacket 14 can be made of any number of polyamide materials, preferably the jacket 14 is made from a polyamide material selected from the following: nylon 6; nylon 6,6; nylon 11; or nylon 12; or other nylon alloy or other alloy such as TPE and santoprene. It should be noted that the selection of a particular material should be based upon the physical requirements of the particular hose assembly application. For example, nylon 6 and nylon 6,6 offer higher heat resistant properties than nylon 11 or nylon 12, whereas nylon 11 and nylon 12 offer better chemical resistant properties than nylon 6 or nylon 6,6. Thus, the ultimate selection of a material for the jacket 14 should be based upon requirements of a particular hose assembly application.

In addition to those polyamide materials previously mentioned, other nylon materials such as: nylon 6,12; nylon 6,9; nylon 4; nylon 4,6; nylon 7; and nylon 8 can also be used. Ring containing polyamides including aliphatic-aromatic polyamides e.g. nylon 6,T and nylon 6,I can also be used. Finally, the jacket 14 can also be made of various polyamide blends or elastomers. Again, it is noted that the selection of particular jacket 14 material is dependent upon the specific physical requirements of a particular hose assembly.

The jacket 14 can also be made of an expanded material such as polyamide. The expanded jacket 14 and 15 shown in FIGS. 1, 2, and 3. Alternatively, the jacket 14 can include an unexpanded material. Although expanded and unexpanded jackets 14 both offer the hose assembly 10 increased tube and tensile strength, the expanded polyamide is preferred. The expanded material offers the hose assembly 10 substantially the same degree of strength as the unexpanded material while significantly reducing the weight of the hose assembly 10. That is, the expanded polyamide material is significantly lighter in weight than the unexpanded material due to the presence of void spaces therein formed during the expansion process. The expanded material also has an increased wall for fitting attachment. The expansion process, commonly known in the art as "foaming", generally takes place while extruding the jacket 14.

Such foaming processes generally require blowing agents such as "CELOGEN HT 550™", or exothermic blowing agent sold by Uniroyal Chemicals or "ACTIVEX 537™", or other endothermic blowing agent sold by B.I. Chemicals. The blowing agent is generally intermixed with material, such as polyamide, during the extrusion of the jacket 14 and causes expansion of the material by producing gas, thereby forming void spaces within the jacket 14.

The undulations or corrugations 42 on the jacket 14, provide additional bend radius to the hose assembly 10. There are two specific types of undulations or corrugations that can be present on the jacket 14, there types are spiral (FIG. 2) or circular (FIG. 3) undulation. Further, the entire hose assembly 10 or portions thereof can be corrugated. This allows the manufacturer to undulate or corrugate only those portions which will be bent thereby only providing this additional support where necessary which improves bending. Also included in the hose assembly 15 can be cuffs for attachment.

There are a number of methods for fabricating the hose assembly 10, one particular well known method involves a two part extrusion process typically known as "cross-head" extrusion. The typical "cross-head" extrusion method involves first extruding an first layer, such as the fluoropolymer first layer 12, then extruding an jacket thereover, such as the polyamide or other jacket 14. This method of fabrication is particularly effective when utilizing an first layer 12 comprising polytetrafluoroethylene. Additionally, when utilizing thermoplastic fluoropolymer materials, co-extrusion methods of fabricating can be applicable. As commonly known in the art, co-extrusion methods involving utilizing two extruders at once thereby forming both inner layer and jacket simultaneously.

The assembly can also be made using the following method. The foamed structure can be formed by utilizing both a chemical blowing agent formulated with the melt extrudable fluoropolymer material prior to extrusion and by injecting a physical forming agent such as in inert gas into the barrel of the extruder as described above.

The control of void size and void content is critical as these parameters affect both the flexibility and permeability of the product. For example, an extruded tubular structure having a high content of small voids will yield a more flexible tubular structure. A tubular structure having a low content of large voids will yield a more rigid foamed tubular structure. In general, the void content of the tubular structure 10 can range from approximately 5-85%. Preferably, the void content ranges from approximately 20% to 50%. Also, in the preferred embodiment of the present invention, the voids or cells are closed. Closed cells or voids are preferred over open voids or cells as open cells can allow the migration and/or collection of fluids within the wall 16 of the tubular structure 10.

The amount of closed cells versus open cells in the extrudate can be varied by controlling factors such as the die temperature, melt temperature of the polymer, and the amount of blowing agent used.

During the extrusion of the expanded tubular structure 10, a skin 20, can be formed on either the outer surface 12, inner surface 14, or both surfaces of the extruded tubular structure 10. As described above, the skin 20, is a thin layer, which can be varied in thickness. The skin creates a substantially smooth surface, which defines the margins of the inner and/or outer diameters of the tubular structure 10. The skin also creates a better bond.

The skin can be formed by several methods. A preferred method of forming the skin on either the outer surface 12, the inner surface 14, or both includes cooling or chilling either the mandrel, the die, or both to cause the formation the skin 20. By cooling or chilling the mandrel, the inner diameter of the tubular structure 10 or the inner surface 14 of the tubular structure 10, a skin can be formed. Likewise, by coding or chilling the die, the outer diameter of the tubular structure 10, or outer surface, 12, the skin 20 can be formed. It is generally thought that chilling or cooling either the mandrel, the die, or both, causes the closed voids or cells contacting thereon to break, thus forming the skin 20. The temperature necessary to cause the formations of the skin 20 ranges from 300 to 700° F. depending on the polymer used. In general, a temperature decrease needed to form a skin is approximately 10-25% cooler than the melt temperature of the polymer. Also, a cooling bath or vacuum chamber can be used to solidify the small cell structure, which has been generated and to prevent blowholes on the surfaces of the foamed article.

Additionally, the skin 20 can be formed by coating either the mandrel, die, or both with a substance such as a defoaming agent like a polysiloxane co-polymer which, when the foamed or expanded fluoropolymer material comes into contact, causes the closed cells or voids to burst thereby yielding the skin 20.

After the extrudate has exited the die and mandrel, the extrudate immediately enters a chamber in which a vacuum is applied to the outer surface 12 of the tubular structure 10 to prevent the tubular structure 10 from collapsing. Within this vacuum chamber, a uniform negative pressure is applied about the outer surface 12 of the tubular structure 10. The amount of negative pressure ranges from approximately 10 inches of water to approximately 200 inches of water. The uniform application of the negative pressure about the outer surface 12 of the tubular structure 10 yields a tubular structure 10 having a substantially uniform eccentricity and concentricity. The co-extrusion process can also occur without the use of a vacuum.

Additionally, the formation of the skin 20 and the eccentricity and concentricity of the tubular structure 10 can be altered by varying the length of the die and/or the mandrel.

The vacuum chamber can include a cooling or quenching fluid, such as water, which causes the substantially molten expanded fluoropolymer material comprising expanded tubular structure 10 to solidify. This solidifying step can also occur outside of the vacuum chamber. That is, the extrudate can pass through the vacuum chamber and into a separate zone or container wherein it contacts the cooling fluid where the molten fluoropolymer material is solidified.

At this point, the formation of the expanded tubular structure 10 is substantially complete. As described above, a hose assembly 10 can be constructed by disposing at least one jacket 14 about the tubular inner liner 12. The jacket 14, as described above, can be disposed about the tubular first layer 12 either by extrusion, braiding, or other techniques known to those skilled in the art. The methods for applying the jacket 14 about the tubular layer 12 are described in detail above.

After the hose assembly has been formed, the hose is sent through a molding type machine. The molding machine is made up of pairs of presses 44, which form the corrugation or undulation on the outer surface of the jacket 14. The mold presses 44 are configured to form undulations on the opposite sides of the hose 10 thus creating the undulations about the entire outer surface of the jacket 14. The undulations 42 can either be formed on the hose assembly 10 while the assembly is still warm or the hose assembly 10 can be allowed to cool and the presses 44 can be heated such that the heat from the presses 44 forms undulations 42 on the exterior of the hose assembly 10. This allows the manufacturer to either undulate or corrugate the entire hose 10 or only portions thereof. Additionally, the presses 44 are slidably attached to the molding machine thus allowing the presses 44 to be moved thus enabling the manufacturer to determine what part of the tubing will be undulated. Also, there are two specific types of undulation that can be present on the jacket 14, these types can include, but are not limited to, spiral (FIG. 2), circular (FIG. 3), or spring undulations. The type of undulations 42 depend upon the configuration of the mold presses 44 or pressure-forming the outside with internal mandrels or air pressure or cross head extrusion with an internal mandrel with pressure forming dies outside.

Alternatively, the convolutes can be made using any other materials known to those of skill in the art. For example, the convolutes can be injection molded onto the jacket 14 or outside surface 13 of the first layer 12. This embodiment enables various different types of undulations to be formed, including odd shapes. The injection molding can take place either prior to or subsequent to formation of the hose assembly 10 and is accomplished using techniques known to those skilled in the art.

The undulations 42 can also be made by other methods known to those of skill in the art. For example, the undulations 42 can be formed by eroding away the extra material of the assembly 10 thereby creating the undulations 42 with the remaining material of the assembly 10. The eroding can be accomplished with chemicals or high-pressure water. Another methods involves mechanically removing the extraneous material from the assembly 10, such that the remaining material forms the undulations 42. This method can include mechanically cutting or scraping the material from the hose assembly 10, or any other machining methods known to those of skill in the art. In a further embodiment of the present application, the undulations 42 are formed by a radially outward pulsing pressure application on a heated outer surface of the hose assembly 10. Presently, the pulsing can either by static thus forming circular undulations 42 or it can be a rotating pulse, which forms spiral undulations 42. Other types of pulsing pressure applications as are known to those of skill if the art can also be used.

Due to the chemical inertness and general lubricious nature of fluoropolymer materials, relative movement between the inner 12 and outer 14 layers is often encountered. In hose applications that require immobility between adjacent layers, the present hose assembly 10 can be modified to eliminate such relative movement between the inner 12 and outer 14 layers.

Figure 4:
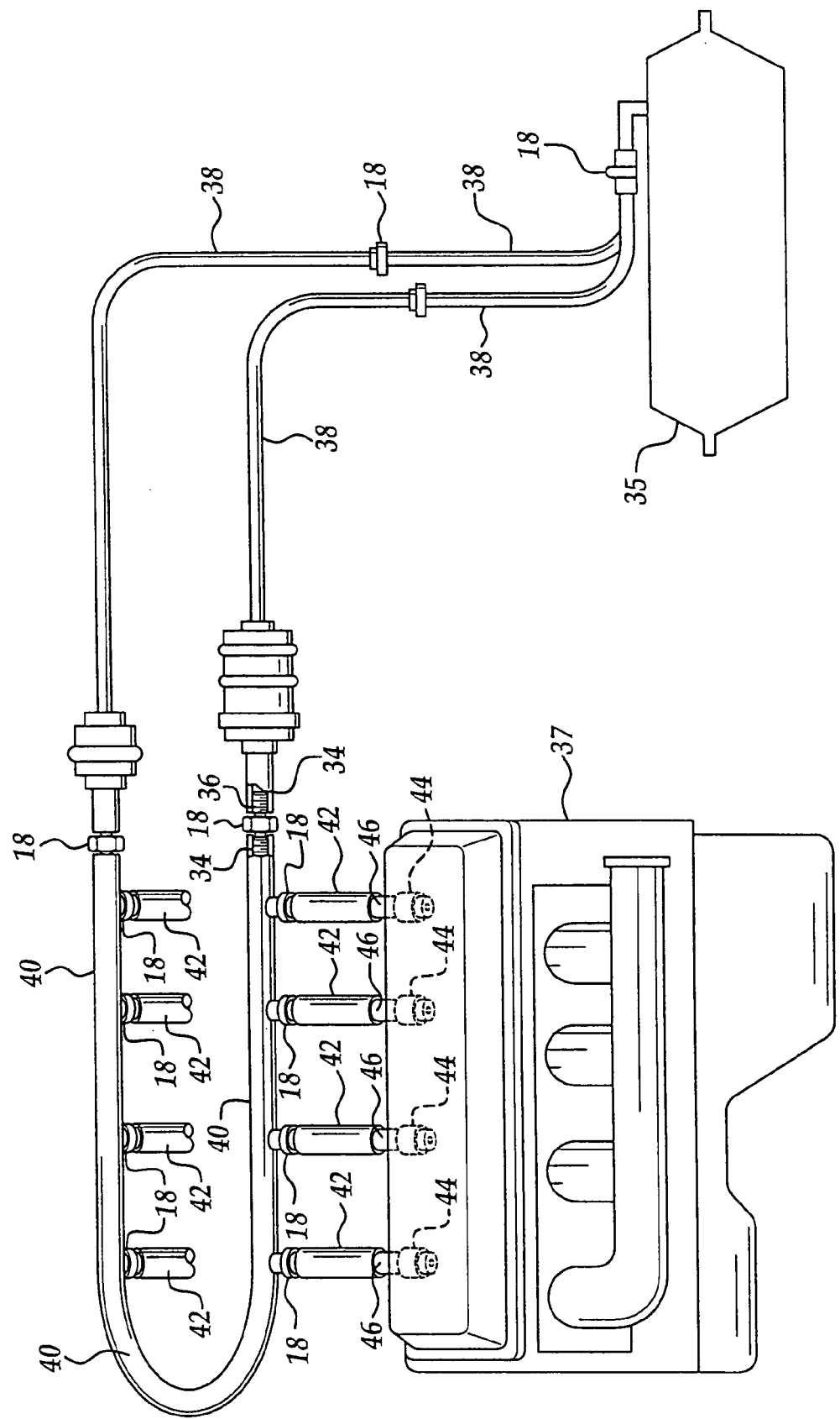
FIG. 4 is a schematic view, of a fuel system showing three separate applications of the subject invention.

One embodiment for eliminating relative movement between the inner 12 and outer 14 layers involves etching an outer surface 20 of the first layer 12 prior to disposing the jacket 14 thereabouts, as shown on FIG. 4. Etching techniques are well known in the art and examples of common etching techniques include acid treatment, plasma treatment (i.e. corona treatment), and mechanical scuffing, and adhesive. Subsequent to etching, the outer surface 20 of the first layer 12 maintains an irregular configuration 22 as shown in FIG. 4. Essentially, the irregular configuration 22 includes of rough surface having a plurality of cavities and protuberances therein.

Subsequent to etching the outer surface 20 of the first layer 12, the jacket 14 is extruded thereover. During this extrusion, an inner surface 24 of the jacket 14 is shaped into mating engagement with the irregular configuration 22 of the outer surface 20 of the first layer 12, thereby resulting in a mechanical and/or chemical bond therebetween. This mechanical and/ or chemical bond prohibits relative movement (rotational or longitudinal) between the inner 12 and outer 14 layers.

An alternative embodiment for eliminating relative movement between the inner 12 and outer 14 layer is shown on FIG. 1. The alternative embodiment includes disposing of at least one braided layer between the inner 12 and outer 14 layers. More specifically, the alternative embodiment includes a braided or woven layer 26 disposed in an interweaving fashion, or wrapped tightly about the outer surface 20 of the first layer 12. Preferably, the material used for the braided layer 26 is a glass fiber. Glass fibers are preferred due to relative low cost and superior heat resistant properties.

The braided or woven fibers can be tightly wound or they can be loosely wound about the first layer 12, having wide gaps between adjacent fibers. Subsequent to position of the braided layer 26 about the first layer 12, the jacket is extruded thereover. During this extrusion, the inner surface 24 of the jacket 14 shapes into mating engagement with the irregular configuration 31 of the intermediate coating 28 thereby resulting in mechanical and/or the chemical bond therebetween, the chemical bond only occurring when there are gaps between the braid or helix. This mechanical bond prohibits relative movement (rotational and longitudinal) between a braided layer 26/intermediate coating 28 and jacket 14. Additionally, other methods of material compatibilization can also be used in accordance with the present invention. These methods merely require that the inner layer 12 be made compatible with the jacket 14. By making the inner layer 12 and jacket 14 compatible a better bond is formed between the two surfaces.

Additionally, as fluid flows to the first layer 12, electrical charges tend to build throughout the length of first layer 12. In order to prevent these electrical charges from accumulating, the first layer 12 preferably includes an integral, longitudinal conductive strip 16 co-extensive with the length of the first layer 12 for conducting electrical charge along the length of the first layer 12. Preferably the inner integral conductive strip 16 includes of conductive strip 30 with carbon black, as shown in FIG. 1. Alternatively, the integral conductive strip 16 can include an first layer 32 of carbon black positioned adjacent an inner surface 33 of the first layer 12 as shown in FIGS. 2 and 3. Alternatively, the integral conductive strip 16 can be interspersed throughout the first layer 12 by intermixing carbon black throughout the fluoropolymer material while the first layer 12 is extruded. The braided layer 26, intermediate coating 28, and jacket 14 are all preferably electrically nonconductive. This is important in that electrical charges applied to the exterior of the hose assembly 10 are not conducted along its length nor to the fluid passing therethrough. It will be understood that the integral conductive strip can include conductive material other than carbon black.

The assembly 10 further includes a coupling mechanism 18 as shown in FIG. 4. The coupling mechanism 18 is adapted to engage the ends of the hose assembly 10 for interconnecting the hose assembly 10 to a flow of fluid, e.g. fluid flow 2 and from a fuel tank 35. More particularly, the coupling mechanism 18 includes a coupler 18 or joint having an insert portion 34 for inserting into and engaging the inner surface 33 (FIGS. 1 and 2) of the first layer 12. The insert portion 34 can have a plurality of barbs 36 for engaging the inner surface 33 (FIGS. 1 and 2) of the first layer 12, as thus viewed in FIG. 4. The coupling mechanism 18 can also include an engaging portion extending longitudinally from the insert portion 34 for engaging a fitting. The engaging portion can include a male threaded member or a female threaded member. The engaging portion can include any configuration that will cooperate with the member to which it is to be connected with. For example, the engaging portion can include a socket to receive a mating ball joint. Alternatively, in place of the engaging portion, the coupling mechanism 18 can provide an additional insert portion 34 for inserting into the interior surface of the first layer 12 of another hose assembly 10 as shown in FIG. 4. Thus, the coupling mechanism 18 can operate as a joint between independent hose assemblies 10 thereby interconnecting them to allow fluid flow therebetween. The coupling mechanism 18 is preferably made from organic polymeric material and mechanically connected to the hose assembly 10, as shown in FIG. 4. Alternatively, the coupling mechanism 18 can be molded to the hose assembly.

Throughout this application, various publications, including United States patents, are referenced by citation or number. All citations for these publications are listed below. The disclosure of these publications and patents in their entireties are hereby incorporated by reference into the application in order to more fully describe the state of the art to which this invention pertains.

The invention has been described in an illustrative manner, and it is to be understood that the terminology, which has been used is intended to be in the nature of words of description, rather than of limitation. Obviously, many modifications and variations of the present invention are possible in light of the above teachings. It is, therefore, to be understood that within the scope of the appended claims, the invention can be practiced otherwise than is specifically described.

What is claimed is:

1. A method of making a hose assembly including the steps of:
   extruding into a tube shape a tubular smooth inner fluoropolymer layer having a substantially smooth inner surface;
   forming an a substantially continuous jacket having a substantially smooth outer surface over the inner fluoropolymer layer while adhering said jacket and said inner layer together; and
   corrugating said jacket after said forming step, said corrugating step further defined as etching the corrugation on the jacket so that said outer surface has undulations.

2. The method as set forth in claim 1, wherein forming a smooth inner fluoropolymer layer comprises forming an inner fluoropolymer layer with a substantially smooth inner surface.

3. The method as set forth in claim 1, wherein forming a jacket over the inner fluoropolymer layer comprises extruding the jacket over the smooth inner fluoropolymer layer.

4. The method as set forth in claim 1, further characterized by depositing at least one braided layer between said inner and said jackets.

5. The method as set forth in claim 1 said corrugating step further defined as forming a spiral corrugation on the jacket.

6. The method as set forth in claim 1, said corrugation step further defined as forming a circular corrugation on the jacket.

7. The method as set forth in claim 1, wherein said corrugating step includes injection molding the corrugations to the hose assembly.

8. The method as set forth in claim 1, wherein said extruding step comprises extruding the tube shape melt extrusion.

9. The method as set forth in claim 1, wherein said extruding step comprises extruding the tube shape paste extrusion.

10. A method of making a hose assembly including the steps of:
    extruding into a tube shape a tubular smooth inner fluoropolymer layer; forming a substantially continuous jacket over the inner fluoropolymer layer while adhering said jacket and said inner layer together; and corrugating said jacket, said corrugating step further defined as etching the corrugation on the jacket.

11. The method as set forth in claim 10, said corrugation step further defined as forming a circular corrugation on the jacket.

12. The method as set forth in claim 10, wherein said corrugating step includes injection molding the corrugations to the hose assembly.

13. The method as set forth in claim 10, wherein said extruding step comprises extruding the tube shape paste extrusion.

14. The method as set forth in claim 10, said corrugating step further defined as forming a spiral corrugation on the jacket.

* * * * *